Patented Jan. 1, 1929.

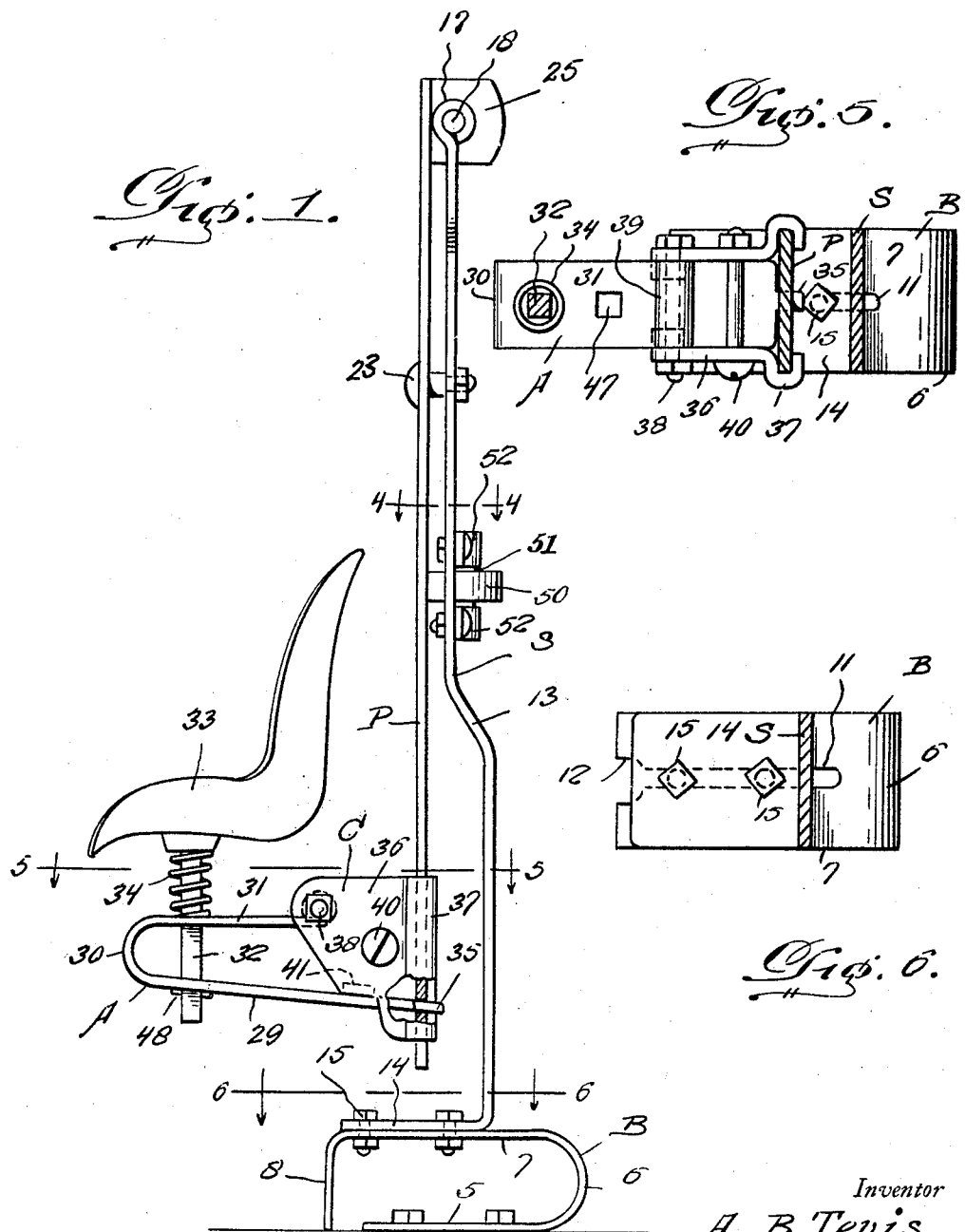

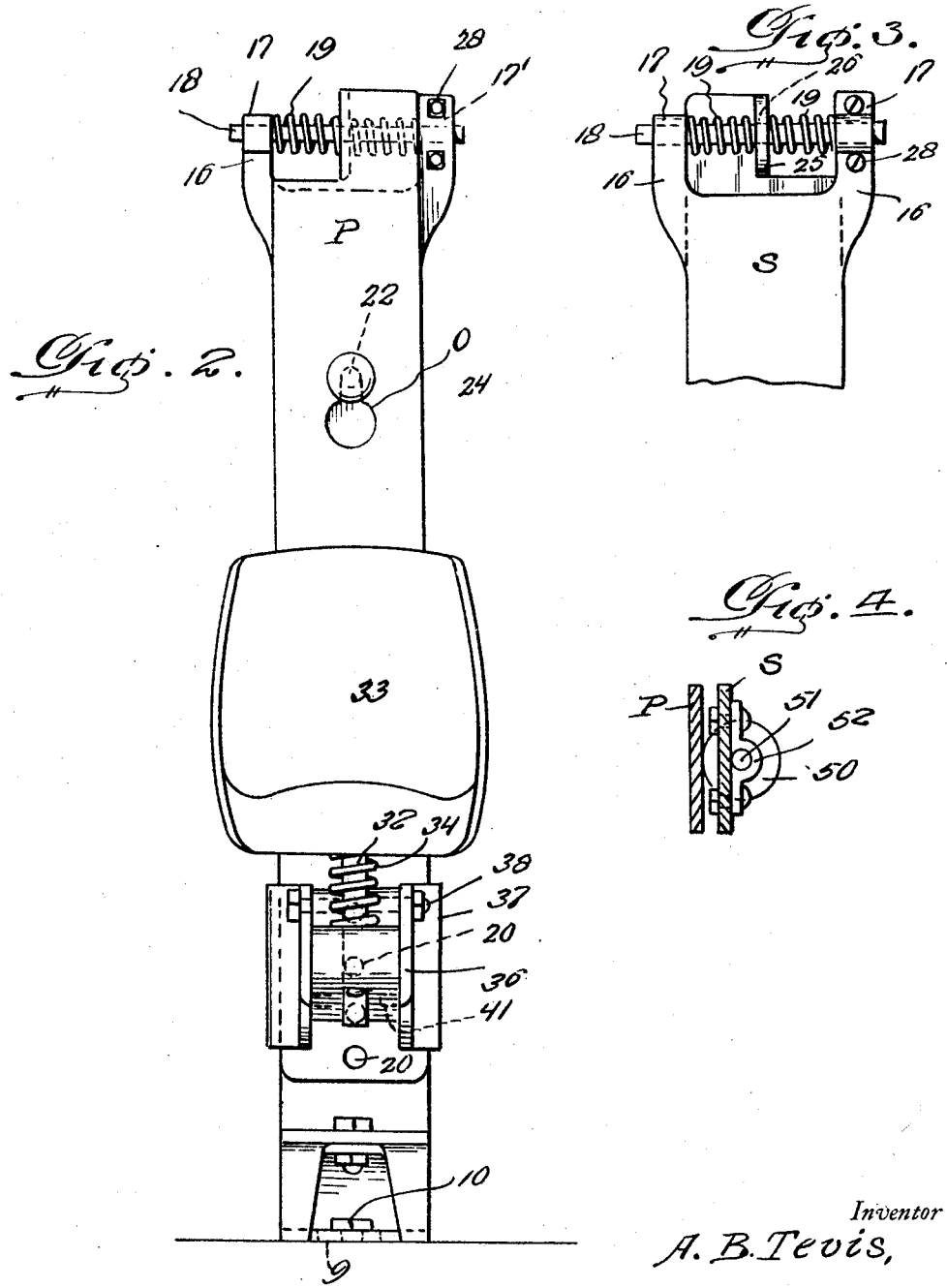

1,697,093

UNITED STATES PATENT OFFICE.

ARTHUR B. TEVIS, OF ALTUS, OKLAHOMA.

CAB OR DECK SEAT.

Application filed December 20, 1927.  Serial No. 241,321.

The present invention relates to a seat for use on locomotive cabs, tractors, reapers, binders, and sundry other motive engines or machines and has for its prime object to eliminate and overcome the ridges, jolting motion particularly resultant from the lateral swing or side swing of the engine or machine in motion, just permitting the operator to retain his proper position.

Another very important object of the invention resides in the provision of a seat structure of this nature which provides necessary adjustment so as to position the seat for the convenience of different operators using the same.

Another very important object of the invention resides in the provision of a seat which is free to swing upon a pivot, laterally or sidewise, in such a way as to counteract and eliminate the lateral motion of the moving object on the machine, the swing of the seat being regulated by spring means located remote from the pivot.

Another very important object of the invention resides in the provision of a seat structure of this nature which is simple and easy in its adjustment, being capable of adjustment at its base forwardly or rearwardly and the height of the seat being adjustable.

Another very important object of the invention resides in the provision of a structure of this nature wherein the parts are capable of easy and quick assembly and disassembly.

A still further very important object of the invention resides in the provision of a seat structure of this nature which is strong and durable, compact and convenient, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the seat structure embodying the features of my invention, Figure 2 is a front elevation thereof, Figure 3 is a rear elevation of the upper portion thereof, Figure 4 is a transverse horizontal section taken substantially on the line 4—4 of Figure 1, Figure 5 is a horizontal transverse section taken substantially on the line 5—5 of Figure 1, and Figure 6 is a transverse section taken substantially on the line 6—6 of Figure 1.

Referring to the drawing in detail, it will be seen that the letter B denotes a base which is of U-shaped formation to comprise a bottom side 5 merging at one end into a bight 6 rising therefrom and merging into an upper side 7 extending over the bottom side 5 and terminating in a depending leg 8. The bottom side 5 is provided with transverse slots 9 through which may be extended screws, bolts or other suitable fastening elements 10 to secure the base to the floor or other support, said slots permitting transverse adjustment of the base as may be desired from time to time. The upper side 7 is provided with an elongated longitudinally extending slot 11 which partially extends into the upper portion of the leg 8 to form a relatively wide entrance 12.

The letter S denotes a standard which rises from the base B. This standard S is offset intermediate its ends as at 13 so that the upper portion of the standard is located forwardly of the lower portion thereof. The bottom end of the standard S has a forwardly directed extension 14. Bolts 15 extend through the extension 14 and through the slot 11 in order that the standard may be secured to the base and may be adjusted longitudinally thereof. The upper end of the standard is provided with upwardly directed and laterally offset extensions 16 which terminate at their upper ends in bearings 17 that are alined to receive a pin 18 having a pair of springs 19 thereon.

The letter P denotes a pendulum which is in the form of a straight bar the lower end being formed with a series of longitudinally spaced openings 20. The intermediate portion of the pendulum P is provided adjacent the upper portion thereof with an opening O the lower portion of which is comparatively enlarged as is indicated at 21 while the upper portion thereof is comparatively small as indicated at 22. A pivot bolt 23 projects from the intermediate portion of the upper part of the standard S and the head of this pivot bolt is sufficiently small to pass through the portion 21 of the opening O so that the shank of the bolt may be received in the relatively small portion 22. Thus the pendulum may be easily and quickly assembled and disassembled in respect to the standard S when desired and yet is prevented from accidental disassembly therefrom. The upper end of the pendulum P has one corner thereof bent rearwardly to provide an extension denoted specifically by the numeral 25 and apertured to receive the pin 18. This extension 25 is disposed between the springs 19 and these springs are so tensioned as to impinge against the bearing 17 and against the extension 25 to normally hold the extension 25 centrally on the pin 18 that is to normally hold the pendulum in a vertical position. The opening in the extension 25 is indicated in dotted lines in Figure 3 by numeral 26 and it is noted that this opening is sufficiently large to accommodate the arcuate movement of this extension 25 in respect to the axis formed by the pivot bolt 23. One of the bearings 17 has a detachable cap 17' normally held in place by bolts 28 so that this cap may be removed for the ready assembly and disassembly of the pin 18 in respect to said bearing 17.

The letter A denotes generally a seat bracket which is of U-shaped formation to comprise a bottom relatively long arm 29 merging at one end into an upwardly extending curved bight 30 which in turn merges into an upper relatively short arm 31. These arms 9 and 31 are provided with registering openings to receive a shank 32 of a seat 33, the shank depending from the seat and having a spring 34 thereabout resting on the arm 31 and abutting the bottom of the seat or an enlargement on the shank. The other end of the arm 29 merges into a pin or finger 35 adapted to extend into one of the openings 20 depending upon the desired height of the seat from the floor or other support. A clamp structure C engages the bracket A on the bottom end of the pendulum and comprises a pair of side plates 36 having curved jaws 37 at their rear edges to receive the side edges of the lower portion of the pendulum P. A bolt 38 extends through the plates 36 and through a sleeve 39 formed on the extremity of the upper arm 31. A clamping bolt 40 extends through the plates 36 and may be tightened for clamping the jaws of the plates in tight frictional engagement with the side edges of the pendulum P. Bottom edges of the plates 36 have inwardly directed fingers 41 to rest on top of the lower arm 29 as is clearly indicated in Figure 2. Obviously the bolt 40 may be unloosened so that the bracket A may be rocked on the bolt 38 to withdraw the finger 35 from the opening 20 in which it is situated so that the bracket may be raised or lowered and the finger inserted in another one of the openings 20 so as to dispose the seat at the desired height and then, of course, the bolt 40 will be tightened to securely and frictionally clamp the jaws 37 against the side edges of the pendulum.

The seat 33 may be made of metal or wood, dressed or cut, to form an ordinary seat with or without a back and may be cushioned if desired. The shank 32 which extends through the openings 47 is square so as to prevent turning of the post in respect to the bracket A. I preferably provide two or more of the openings 47 in each arm 29, 31 so that the seat may be adjusted forwardly or rearwardly as may be desired in respect to the pendulum P. In order to prevent accidental displacement of the shank 32 it is preferable to provide a cotter pin 48 or the like extending therethrough for engaging the bottom surface of the lower arm 29.

From the above detailed description it will be seen that I have provided a floating seat and frame or bracket structure of a flexible and shock absorbing nature because of the resiliency of the bracket A, the standard S and the base B. This seat structure will eliminate or reduce to a minimum the lateral or side swing and absorb shocks incidental to the motion or sway of a moving locomotive or other features of mechanism operated on tracks, highways or the earth surface, said seat floating or swinging on a pendulum dial hanger or support with a device adjusting and regulating its motion. It will also be seen that I provide an anti-friction roller 50 having an axle 51 disposed vertically and journaled in bearings 52. This anti-friction roller 50 projects through an opening in the standard S below the pivot bolt 23 so that the pendulum P may engage therewith thus reducing friction to a minimum and eliminating the tendency of the pendulum to flex too much longitudinally of the motion of the machine or mechanism in which this structure may be mounted.

This structure is easily adjustable in its position forwardly, backwardly or to either side and is adjustable as to its height. It will also be seen that all parts of the apparatus are capable of being readily removed and replaced.

The result of these novel features of construction is the comfort and health of the person using the same.

It is thought that the construction, operation, utility and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In a seat structure of the class described, a resilient base of U-shaped formation including a bottom side for anchoring to a support, a curved bight rising from the side at one end thereof and merging into an upper side extending over the bottom side in spaced relation thereto and terminating in a depending leg to engage the support, a standard rising from the upper side, the lower end of the standard having a forwardly directed extension, said upper side having a slot, a bolt extending from the extension through the slot for attaching the standard to the base and allowing longitudinal adjustment, a pendulum, means for pivotally mounting the pendulum on the standard, a bracket on the lower end of the pendulum, and a seat on the bracket.

2. In a seat structure of the class described, a resilient base of U-shaped formation including a bottom side for anchoring to a support, a curved bight rising from the side at one end thereof and merging into an upper side extending over the bottom side in spaced relation thereto and terminating in a depending leg to engage the support, a standard rising from the upper side, the lower end of the standard having a forwardly directed extension, said upper side having a slot, a bolt extending from the extension through the slot for attaching the standard to the base and allowing longitudinal adjustment, a pendulum, means for pivotally mounting the pendulum on the standard, a bracket on the lower end of the pendulum, and a seat on the bracket, the upper end of the standard being provided with a pair of laterally offset extensions rising upwardly therefrom and terminating in bearings, a pin in said bearings, springs on said pin, the upper end of the pendulum provided with an extension having an opening to receive the pin, said extension being disposed between the springs.

3. In a seat structure of the class described, a resilient base of U-shaped formation including a bottom side for anchoring to a support, a curved bight rising from the side at one end thereof and merging into an upper side extending over the bottom side in spaced relation thereto and terminating in a depending leg to engage the support, a standard rising from the upper side, the lower end of the standard having a forwardly directed extension, said upper side having a slot, a bolt extending from the extension through the slot for attaching the standard to the base and allowing longitudinal adjustment, a pendulum, means for pivotally mounting the pendulum on the standard, a bracket on the lower end of the pendulum, and a seat on the bracket, said bracket comprising a U-shaped member to include a lower relatively long arm and an upper relatively short arm, said short arm terminating in a sleeve, said lower arm terminating in a finger, said pendulum at its lower end being provided with a vertically disposed series of spaced openings to receive the finger, a clamp structure having a bolt extending through the sleeve of the upper arm and jaws to receive the side edges of the lower portion of the pendulum.

4. In a seat structure of the class described, a resilient base of U-shaped formation including a bottom side for anchoring to a support, a curved bight rising from the side at one end thereof and merging into an upper side extending over the bottom side in spaced relation thereto and terminating in a depending leg, to engage the support, a standard rising from the upper side, the lower end of the standard having a forwardly directed extension, said upper side having a slot, a bolt extending from the extension through the slot for attaching the standard to the base and allowing longitudinal adjustment, a pendulum, means for pivotally mounting the pendulum on the standard, a bracket on the lower end of the pendulum, and a seat on the bracket, said bracket comprising a U-shaped member to include a lower relatively long arm and an upper relatively short arm, said short arm terminating in a sleeve, said lower arm terminating in a finger, said pendulum at its lower end being provided with a vertically disposed series of spaced openings to receive the finger, a clamp structure having a bolt extending through the sleeve of the upper arm and jaws to receive the side edges of the lower portion of the pendulum, said clamp structure also including fingers extending over the upper surface of the lower arm.

5. In a seat structure of the class described, a resilient base of U-shaped formation including a bottom side for anchoring to a support, a curved bight rising from the side at one end thereof and merging into an upper side extending over the bottom side in spaced relation thereto and terminating in a depending leg to engage the support, a standard rising from the upper side, the lower end of the standard having a forwardly directed extension, said upper side having a slot, a bolt extending from the extension through the slot for attaching the standard to the base and allowing longitudinal adjustment, a pendulum, means for pivotally mounting the pendulum on the standard, a bracket on the lower end of the pendulum, and a seat on the bracket, said bracket comprising a U-shaped member to include a lower relatively long arm and an upper relatively short arm, said short arm terminating in a sleeve, said lower arm terminating in a finger, said pendulum at its lower end being provided with a vertically disposed series of spaced openings to receive the finger, a clamp structure having a bolt extending through the sleeve of the upper arm and jaws to receive the side edges of the lower portion of the pendulum, said clamp structure also including fingers extending over the upper surface of the lower arm, said arms being provided with openings, a shank receivable in said openings, a spring on said shank resting against the upper arm, said seat being engaged on said shank.

6. In a seat structure, a resilient base of U-shaped formation including a bottom side for anchoring to a support, a curved bight rising from the side and merging into an upper side extending over the bottom side in spaced relation thereto and terminating in a depending leg to engage the support, a standard rising from the upper side, a pendulum pivoted intermediate its ends to an intermediate portion of the standard, a seat, means for mounting the seat on the lower end of the pendulum.

7. In a seat structure, a resilient base of U-shaped formation including a bottom side for anchoring to a support, a curved bight rising from the side and merging into an upper side extending over the bottom side in spaced relation thereto and terminating in a depending leg to engage the support, a standard rising from the upper side, a pendulum pivoted intermediate its ends to an intermediate portion of the standard, a seat, means for mounting the seat on the lower end of the pendulum, the other end of the standard being provided with a pair of spaced bearings, a pin in said bearings, springs on said pin, the upper end of the pendulum being provided with an extension having an opening to receive the pin, said springs being disposed one to each side of the extension.

8. In a seat structure, a resilient base of U-shaped formation including a bottom side for anchoring to a support, a curved bight rising from the side and merging into an upper side extending over the bottom side in spaced relation thereto and terminating in a depending leg to engage the support, a standard rising from the upper side, a pendulum pivoted intermediate its ends, to an intermediate portion of the standard, a seat, means for mounting the seat on the lower end of the pendulum, the other end of the standard being provided with a pair of spaced bearings, a pin in said bearings, springs on said pin, the upper end of the pendulum being provided with an extension having an opening to receive the pin, said springs being disposed one to each side of the extension, an anti-friction roller, means for rotatably mounting the roller on the standard to project through an opening therein to engage the pendulum.

9. In a seat structure of the class described, a resilient base, a standard rising from the base, a pendulum pivoted intermediate its ends to an intermediate portion of the standard, spring means engaging the upper end of the standard with the upper end of the pendulum tending to normally hold the pendulum vertical, a seat, and means for attaching the seat to the lower end of the pendulum.

10. In a seat structure of the class described, a resilient base, a standard rising from the base, a pendulum pivoted intermediate its ends to an intermediate portion of the standard, spring means engaging the upper end of the standard with the upper end of the pendulum tending to normally hold the pendulum vertical, a seat, and means for attaching the seat to the lower end of the pendulum, said last mentioned means comprising a bracket of U-shaped formation including a lower relatively long arm, a bight merging from one end thereof, said bight merging into an upper relatively short arm terminating in a sleeve, the other end of the relatively long arm terminating in a finger projectable into an opening in the bottom of the pendulum, a pair of plates, a bolt engaging the plates and extending through the sleeve, said plates having jaws to receive the side edges of the bottom portion of the pendulum, a bolt extending through the plate so as to draw the plates together to frictionally engage the jaws with the pendulum, said arms being provided with openings, and a shank extending from the seat through said openings.

In testimony whereof I affix my signature.

ARTHUR B. TEVIS.